(12) United States Patent
Kellermann et al.

(10) Patent No.: US 8,827,719 B2
(45) Date of Patent: Sep. 9, 2014

(54) RESUSCITATION MANIKINS AND METHODS OF USING THE SAME

(75) Inventors: Arthur L. Kellermann, Atlanta, GA (US); David Sanborn, Marietta, GA (US); Daniel Wu, Atlanta, GA (US)

(73) Assignee: Emory University, Atlanta, GA (US)

( * ) Notice: Subject to any disclaimer, the term of this patent is extended or adjusted under 35 U.S.C. 154(b) by 2487 days.

(21) Appl. No.: 11/443,604

(22) Filed: May 31, 2006

(65) Prior Publication Data

US 2007/0292828 A1    Dec. 20, 2007

(51) Int. Cl.
*G09B 23/28* (2006.01)

(52) U.S. Cl.
USPC ........... 434/262; 434/191; 434/261; 434/267; 434/271

(58) Field of Classification Search
CPC .......................................... G09B 23/28
USPC .................. 434/191, 261–267, 271
See application file for complete search history.

(56) References Cited

U.S. PATENT DOCUMENTS

| | | | | |
|---|---|---|---|---|
| 3,209,469 A * | 10/1965 | James | .......................... | 434/265 |
| 3,872,609 A * | 3/1975 | Smrcka | .......................... | 434/265 |
| 4,915,635 A * | 4/1990 | Ingenito et al. | .............. | 434/396 |
| 4,984,987 A * | 1/1991 | Brault et al. | .................. | 434/265 |
| 5,195,896 A * | 3/1993 | Sweeney et al. | .............. | 434/265 |
| 5,249,968 A * | 10/1993 | Brault et al. | .................. | 434/265 |
| 5,286,206 A * | 2/1994 | Epstein et al. | ................ | 434/265 |
| 5,330,514 A * | 7/1994 | Egelandsdal et al. | ......... | 434/265 |
| 5,423,685 A * | 6/1995 | Adamson et al. | ............. | 434/265 |
| 5,540,592 A * | 7/1996 | Scheinberg et al. | .......... | 434/265 |
| 5,885,084 A * | 3/1999 | Pastrick et al. | ............... | 434/265 |
| 6,227,864 B1 * | 5/2001 | Egelandsdal et al. | ......... | 434/265 |
| 6,351,671 B1 * | 2/2002 | Myklebust et al. | ............... | 607/5 |
| 2001/0012609 A1 * | 8/2001 | Pastrick et al. | ............... | 434/265 |
| 2003/0022142 A1 * | 1/2003 | Pastrick et al. | ............... | 434/265 |
| 2004/0126746 A1 * | 7/2004 | Toly | .............................. | 434/262 |
| 2007/0054254 A1 * | 3/2007 | Cook et al. | ..................... | 434/262 |

* cited by examiner

*Primary Examiner* — Sam Yao
*Assistant Examiner* — Alvin Carlos
(74) *Attorney, Agent, or Firm* — Thomas|Horstemeyer, LLP.

(57) ABSTRACT

Cardiopulmonary resuscitation (CPR) training manikins and methods of using CPR training manikins are described.

19 Claims, 1 Drawing Sheet

RESUSCITATION MANIKINS AND METHODS OF USING THE SAME

TECHNICAL FIELD

The present disclosure is generally related to resuscitation training devices and, more particularly, is related to manikins and methods for training in cardiopulmonary resuscitation.

BACKGROUND

Manikins have been used for years for training individuals to perform chest compressions and mouth-to-mouth artificial respiration (collectively known as cardiopulmonary resuscitation, or CPR). Manikins have also been used as an instructional adjunct for teaching mouth-to-mouth artificial respiration in situations when cardiac arrest is not a factor. In the past, such manikins have been built in several pieces often including hollow shells of somewhat flexible and resilient materials, with various tubes, bellows, air bladders, valves, and pressure sensors housed within the shells. Articulation of head and neck portions has been accomplished through use of various swivel or hinge joints interconnecting separate parts. Such complexity of manikins provides some realism in the simulation of performing rescue breathing and CPR using such manikins, but adds considerably to the initial cost as well as the cost of cleaning and maintaining such manikins.

The vast majority of existing manikin designs are made of professional-grade materials, so an instructor can repeatedly use it to teach large numbers of trainees. As a result, most CPR manikins are quite expensive—generally hundreds of dollars per unit. In addition, the complexity and cost of previously available manikins made them unaffordably expensive for home use, and thereby created an undesirable limitation on their availability for CPR training in the home.

Even manikins for intended for home use have important limitations. In one instance, the manikin is based on an inflatable torso, and is therefore susceptible to punctures or leaks. In addition, the manikin provides no feedback on hand position or compression depth—both of which are critical elements in providing proper chest compressions. Furthermore, the manikin includes an airway that is functional, but difficult to clean between users.

Thus, a heretofore unaddressed need exists in the industry to address the aforementioned deficiencies and inadequacies.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

SUMMARY

Figure 1:
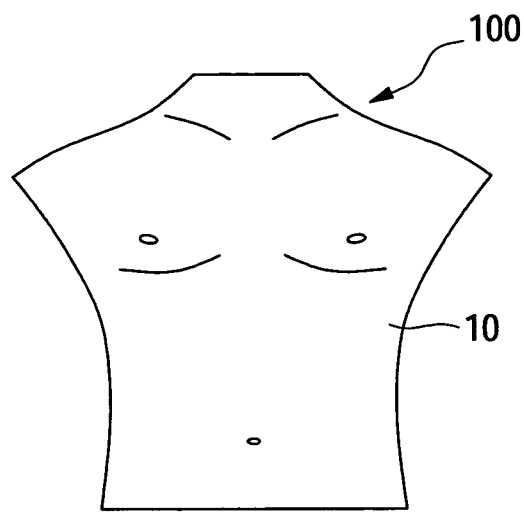
FIG. 1 illustrates a top view of an embodiment of the disclosed cardiopulmonary resuscitation (CPR) training manikin.

Briefly described, embodiments of this disclosure include cardiopulmonary resuscitation (CPR) training manikins and methods of using CPR training manikins. An embodiment of a CPR training manikin, among others, includes: a structure including a plurality of layers of sheets of foam material affixed to each other, wherein the sheets of foam material are cut only into the shape of a human torso; and a sound-generating assembly disposed in a portion of the layer of sheets at a location approximating a mid-sternum area in the torso shape, wherein the sound-generating assembly is configured to produce an audible signal when the portion of the layer of sheets disposed on the sound-generating assembly is depressed with force sufficient for CPR.

Another embodiment of a CPR training manikin, among others, includes: a structure in the shape of a human torso, wherein the structure does not include a feature selected from: neck features, head features, airway features, lung features, features that can simulate resuscitation breathing techniques, and combinations thereof, wherein the structure includes a sound-generating assembly disposed within the structure in a location approximately at the mid-sternum area of the human torso, wherein the sound generating assembly is configured to produce an audible signal when the assembly is depressed.

An embodiment of a method of using a CPR training manikin includes: simulating human chest compressions on a plurality of layers of sheets of foam material affixed to each other, wherein the sheets of foam material are cut only into the shape of a human torso; and listening for a signal on each compression, wherein the signal is produced by a sound generating assembly disposed in a portion of the layer of sheets at a location approximating a mid-sternum area in the torso shape, wherein the sound generating assembly is configured to produce a signal when the sound generating assembly is compressed and released.

An embodiment of a method of using a CPR training manikin includes: simulating human chest compressions on a CPR training manikin; and listening for a signal on each compression, wherein the signal is produced by the sound generating assembly, wherein the sound generating assembly is configured to produce an audible signal when the assembly is pressed and released.

DETAILED DESCRIPTION

The disclosed cardiopulmonary resuscitation (CPR) training manikins represent an inexpensive instructional aid designed to help individuals learn and practice the compression portion of the CPR by allowing them to practice proper CPR technique while observing an instructional video or DVD in the privacy of their home or another instructional setting. Key skills include proper hand placement and application of compressions of proper force and depth. Embodiments of the manikin are focused on imparting skills in chest compressions—the most important element of CPR. Furthermore, embodiments of the manikin are not expensive, are highly durable, are realistic in appearance, and provide feedback to the student as to proper hand position and depth of chest compressions. Although a functional airway is a useful feature, it is not necessary to training individuals to initiate "chest compression only" CPR—a growing practice in many communities.

The disclosed CPR manikin technology is designed to simulate a realistically sized adult torso. In other embodiments, the torso is designed to simulate a properly sized male torso, female torso, teenage torso, child torso, or infant torso.

The materials used to fabricate the disclosed manikin are designed to be inexpensive and durable. The CPR manikin's torso is made of dense foam sheets, covered with a thinner foam sheet or a covering made of nylon or another flexible but durable material. This outermost covering can include, but is not limited to, graphics and/or be slightly contoured to depict anatomical features of a human torso. The foam sheet used for the thorax (chest) is significantly firmer, and therefore less compressible, than the foam used for the abdomen, thereby replicating the "feel" of the chest versus the abdomen of a human torso. In the center of the manikin's chest, precisely where the rescuer should place their hands to apply proper chest compressions, a circular cut is made in the foam in the shape of a cylinder (see, e.g., FIGS. 2 and 3) or another shape, thereby forming a compartment.

To facilitate the user in learning the proper procedure for chest compressions, a pressure-activated sound-generating assembly or device (e.g., a "clicker", a whistle, or an electrical device that can generate an audible sound) is embedded in the compartment under this foam cylinder. Whenever the student applies compressions to the manikin's chest at this spot with appropriate force to depress the foam cylinder to the proper depth, it activates the sound-generating assembly. If hand placement is inaccurate, or if compressions are not applied with sufficient force, the sound-generating device is activated. Thus, the manikin provides auditory feedback whenever a student applies chest compressions in the correct location and with the proper force, but the signal is not generated if the student compresses the manikin in an incorrect location and/or applies compressions of insufficient force and depth. The force necessary to activate the pressure activated sound-generating assembly depends, at least in part, on the materials covering the pressure-activated sound-generating assembly, the pressure-activated sound-generating assembly, and the like. The material, thickness of the material, and the force necessary to activate the pressure-activated sound-generating assembly can be appropriately adjusted to simulate the forces needed to perform CPR on a person.

One embodiment includes only the torso, and does not include a head, neck, or any type of mechanism or device to simulate a functioning airway and/or lungs. Another embodiment includes a foam head and neck (using the same foam core and cover used for the torso, for example), but does not include features that allow the student to practice mouth-to-mouth artificial respiration. The features of embodiments of the training manikin concentrate the student's attention on mastering the technique of chest compressions—believed to be the most important component of CPR. In contrast to current manikin designs on the market, embodiments of the manikin design will not allow students to practice mouth-to-mouth artificial respiration.

The series of dense foam sheets used to construct the disclosed CPR training manikin are cut and glued to resemble the shape of an adult male torso. In an embodiment, the topmost layer, the covering, includes a textured material to resemble the look and feel of skin. In an embodiment, the covering may be slightly molded in three dimensions so as to approximate human anatomy in the torso region (e.g., the sternal notch, sternum, pectoral muscles, nipples, ribs and rib margin, xyphoid, and upper abdomen). In another embodiment, the covering includes visible artwork to depict these same key anatomic landmarks (e.g., the sternal notch, sternum, pectoral muscles, nipples, ribs and rib margin, xyphoid, and upper abdomen).

The sheets below this topmost layer can be made of firm but compressible foam of varying densities to depict the softer abdomen and less compressible chest. In one embodiment, the entire foam assembly is backed by a lightweight but strong fiberboard base used to contain the audible signal components and to ensure that the manikin is not placed on an uneven surface that might affect the transmission of the applied force. The components of the manikin are designed to approximate the shape and compressibility of a human torso.

To give the user of the manikin instant feedback about proper hand placement while administering CPR, the sound-generating assembly can be placed into a small compartment directly below the center of the manikin's chest (e.g., the mid-sternum of a human). The sound-generating assembly can be a mechanical and/or electrical device adapted to produce an audible signal or sound (e.g., a click) and/or a visual indication or signal in response to proper chest compressions. For example, if the user places the heel of his/her hand in this spot and compresses the manikin's torso to the proper depth, the sound generating assembly produces an audible sound or "click" with each compression. If improper technique is used (e.g., poor hand location and/or insufficient compressions), then no sound is generated. In an embodiment, a sound can be generated signaling that proper force was used at the appropriate location, while another sound is generated indicating that an incorrect amount of force was used and/or the location was incorrect.

Unlike other training manikins, an embodiment of the disclosed manikin core design lacks a neck, head, airway, lungs, features that can simulate resuscitation breathing techniques, arms, or legs. In an alternative embodiment, the manikin may include a non-functional neck or head for aesthetic reasons. However, in the embodiment including a neck and/or head for aesthetic reasons, the disclosed manikin does not include an apparatus or other features for teaching resuscitation breathing techniques.

The disclosed CPR training manikin represents a marked departure from current CPR manikin designs, with several attendant advantages. For example, instead of being constructed of expensive, high-grade plastic, or a less durable material such as inflatable vinyl, the disclosed manikin includes an inexpensive but highly durable foam core sandwiched between a fiberboard base, and optional textured "skin". In addition, instead of incorporating a head and neck with functional face, mouth, head, airway connected to artificial lungs or other features that allow users to practice resuscitation breathing techniques, the CPR manikin design disclosed herein focuses trainees on the technique of chest compressions. In another embodiment, other materials can be used to form the manikin (e.g., plastic and the like).

One advantage of embodiments of the present disclosure is that the manikin is less expensive to produce than competing designs, thereby promoting home sales and home use, and other additional advantages. By lacking any moving parts for neck, head, airway, lungs, and/or features that can simulate resuscitation breathing techniques, the disclosed manikin is less likely to become damaged or break. Because the disclosed manikin does not allow mouth-to-mouth contact, it does not require cleaning between users. This will dramatically reduce the risk of inadvertent transmission of respiratory viruses and other infectious diseases between one user and another. Finally, the disclosed manikin gives trainees feedback on proper chest compression technique. Current designs lack this feature.

The foam material used is the construction of the torso of the disclosed manikin is more durable than a vinyl and/or inflatable design, which can puncture or leak. The disclosed manikin can be mass-produced from inexpensive materials, making it both portable and affordable for widespread dissemination and use, and even home use.

Having thus generally, described the disclosed manikin, further reference will now be made to the figures. FIG. 1 illustrates a top view of an embodiment of the disclosed CPR training manikin 100. In this embodiment, no neck features, head features, airway features, and lung features (i.e., features that can simulate resuscitation breathing techniques) are present.

Figure 2:
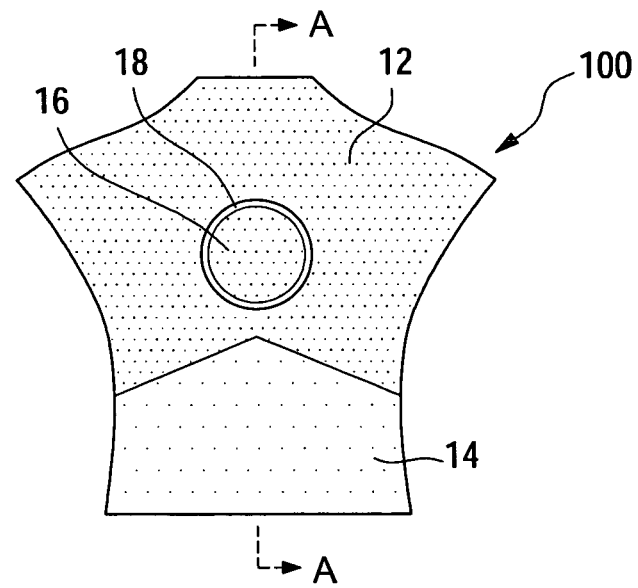
FIG. 2 illustrates a top view of an embodiment of the disclosed CPR training manikin of FIG. 1.

FIG. 2 depicts a top view of an embodiment of the disclosed cardiopulmonary resuscitation (CPR) training manikin 100 of FIG. 1. Specifically, in the embodiment illustrated in FIG. 2, the top covering (e.g., "skin" of torso) 10 has been removed. FIG. 2 shows a composite foam core made up of two different density foam materials 12 and 14. In an embodiment, the foam materials are approximately 4" thick.

In an embodiment, the area of the torso representing or approximating the location of a human abdomen is made of the less rigid foam material 14 than the area of the torso representing or approximating the location of the rib cage and sternum areas. In an embodiment, the area of the torso shape approximating rib cage and sternum areas is made of a foam material 12 that is about three times more rigid than the material of the torso shape in the area approximating an abdomen. The exact ratio of the rigidities of the foam materials 12 and 14 of the two areas can vary.

As shown in FIG. 2, in one embodiment, the area of the torso shape representing the target compression area (e.g., the sternum area) 16 is a piece of foam separated from the other foam by a small cut-out or gap 18. In one embodiment, the area of the torso shape representing the target compression area (e.g., the sternum area) 16 about a four-inch diameter piece of the more firm (semi-rigid) foam 12 that is separated from the other semi-rigid material 12 by a gap or cut-out 18 of about 1/16 inch to 1/8 inch.

Figure 3:
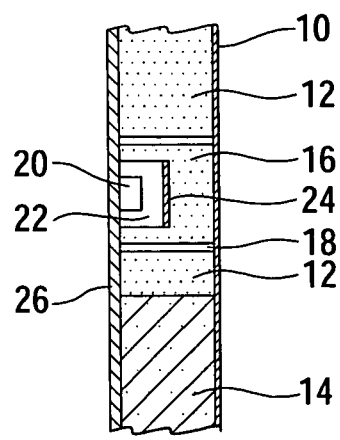
FIG. 3 is a side cutaway view down line A-A of the disclosed CPR training manikin of FIG. 2.

FIG. 3 is a side cutaway view down line A-A of the disclosed CPR training manikin of FIG. 2. Specifically, FIG. 3 depicts a side view of the target compression area 16, which includes a sound generating assembly 20 disposed in the disclosed CPR training manikin 100. As noted above, the user pushes on the target compression area 16 (e.g., the mid-sternum) to simulate the sort of chest compression that would be administered during CPR. If the force of the simulated chest compression is sufficient and in the proper location, the sound generating assembly 20 is actuated. The purpose of the gap 18 shown in FIGS. 2 and 3 is to insure that only a deflection in this area will result in an audible signal. In an embodiment, the sound-generating assembly 20 is similar to those used in toys and board games. In another embodiment, the sound-generating assembly can be a pressure-activated whistle or a more advanced electronic device that produces audible sound and/or a visual indication or signal.

As shown in the embodiment of FIG. 3, the sound-generating assembly 20 can be attached to the rigid backing. The sound-generating assembly 20 is located in a cavity 22 in the lower half of the target compression area 16. Foam 12 and a rigid plastic plate 24 are disposed on the top of the cavity 22. The sound-generating assembly 20, the foam 12, the gap 18, and the less rigid foam 14 can all rest or be disposed on or attached to a plastic sheet 26. As the foam piece 12 is compressed by applied force, the rigid plastic plate 24 on the top of the cavity 22 is forced against the sound-generating assembly 20, activating a sound (e.g., a "click") to provide audible feedback to a user of the manikin. A student can push very hard on a location outside the target compression area 16 defined by the target foam, and the sound-generating assembly 20 does not sound. Likewise, if the student pushes in the proper location of the target compression area 16, but with insufficient force, the sound-generating assembly does not generate a sound.

There are several advantages using embodiments of the manikin disclosed herein. A growing body of evidence suggests that most rescuers, especially citizen bystanders, poorly perform rescue ventilations. Indeed, evidence suggests that much of the benefit of CPR comes from timely provision of chest compressions. Some experts believe that fear of mouth-to-mouth contact may even deter some bystanders from attempting CPR. For this reason, a growing number of communities are training their ambulance dispatchers to provide would-be rescuers with "chest compression only" CPR instructions (CCOIs) over the telephone when they are contacted via 911 to report an apparent cardiac arrest.

The concept of CCOI is based on evolving experimental data and a clinical trial conducted in one community, as noted in a recent review on this topic. Roppolo L P, Pepe P E, Cimon N et al. "Modified cardiopulmonary resuscitation (CPR) instruction protocols for emergency medical dispatchers: rationale and recommendations." Resuscitation. 2005; 65:203-210. The disclosed CPR training manikin is based on the CCOI instructional approach, and greatly simplifies learning and practice for would-be rescuers.

This manikin can be paired with a video self-instruction curriculum so students can learn CPR on their own in the privacy of their home or some other convenient setting. Studies have verified the efficacy of the "video self-instruction CPR" (VSI-CPR) method of CPR training. In two trials, the first involving entering first-year Emory medical students, the second involving citizen volunteers recruited from a church congregation in Atlanta, Ga., it was demonstrated that students randomized to view the 30 minute VSI-CPR video, while practicing with a low-cost manikin, learned to perform CPR of comparable quality to that performed by volunteers who were randomized to the current community standard: a 4-hour American Heart Association instructor-supervised course. Todd K, Braslow A, Brennan R, Lowery D, Cox R, Lipscomb L, Kellermann A: "Randomized, Controlled Trial of Video Self-Instruction Versus Traditional CPR Training." Ann Emerg Med 1998; 31:364-369 and Todd K, Heron S, Thompson M, Dennis R, O'Connor J, Kellermann A: "Simple CPR: A randomized, controlled trial of video self-instructional cardiopulmonary resuscitation training in an African American church congregation." Ann Emerg Med December 1999; 34:730-737. Others have reported similar findings with video self-instruction CPR and a training manikin.

Also disclosed are methods of using a cardiopulmonary resuscitation (CPR) training manikin. In one embodiment the method includes the steps of: simulating human chest compressions on a plurality of layers of sheets of foam material affixed to each other, wherein the sheets of foam material are cut only into the shape of a human torso; and listening for an audible signal on each compression, where in the audible signal is produced by a sound generating assembly disposed in a portion of the layer of sheets at a location approximating a mid-sternum area in the torso shape, wherein the sound generating assembly is configured to produce an audible signal when the sound generating assembly is pressed or released.

It should be emphasized that the above-described embodiments of the present disclosure, particularly, any "preferred" embodiments, are merely possible examples of implementations, and are merely set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A cardiopulmonary resuscitation (CPR) training manikin, comprising:
   a structure including a plurality of layers of sheets of foam material affixed to each other, wherein the sheets of foam material are cut only into the shape of a human torso; and
   a sound-generating assembly disposed in a portion of the layer of sheets at a location approximating a mid-sternum area in the torso shape, wherein the sound-generating assembly is configured to produce an audible signal when the portion of the layer of sheets disposed on the sound-generating assembly is depressed with force sufficient for CPR.

2. The CPR training manikin of claim 1, wherein the structure does not include any of the following features: neck features, head features, airway features, lung features, features that simulate resuscitation breathing techniques, and combinations thereof.

3. The CPR training manikin of claim 1, further comprising:
   an outer covering for a top layer of the sheets of foam material, wherein the covering resembles the feel of human skin.

4. The CPR training manikin of claim 1 wherein the manikin further comprises:
   an outer covering for a top layer of the sheets of foam material, wherein the covering resembles the look of human skin.

5. The CPR training manikin of claim 1 wherein an area of the torso shape representing an abdomen is made of the less rigid material than an area of the torso shape representing rib cage and sternum areas.

6. The CPR training manikin of claim 1 wherein an area of the torso shape representing a rib cage and a sternum area is made of the material that is about three times more rigid than an area of the shape of the torso representing an abdomen.

7. The CPR training manikin of claim 1, wherein the foam sheets comprise a substantially circular cut out, inside of which is disposed the sound generating assembly.

8. A cardiopulmonary resuscitation (CPR) training manikin, comprising:
   a structure in the shape of a human torso, wherein the structure does not include features that simulate resuscitation breathing techniques, wherein the structure includes a sound-generating assembly disposed within the structure in a location approximately at the mid-sternum area of the human torso, wherein the sound generating assembly is configured to produce an audible signal when the assembly is depressed with force sufficient for CPR.

9. The CPR training manikin of claim 8, wherein the sound generating device generates an audible signal.

10. The CPR training manikin of claim 8, wherein the signal is selected from an audible signal, a visual signal, and a combination thereof.

11. A method of using a cardiopulmonary resuscitation (CPR) training manikin, comprising the steps of:
    simulating human chest compressions on the structure of claim 1; and
    listening for a signal on each compression, wherein the signal is produced by a sound generating assembly disposed in a portion of the layer of sheets at a location approximating a mid-sternum area in the torso shape, wherein the sound generating assembly is configured to produce a signal when the sound generating assembly is compressed with force sufficient for CPR and released.

12. A method of using a cardiopulmonary resuscitation (CPR) training manikin comprising the steps of:
    simulating human chest compressions on the structure of claim 8; and
    listening for a signal on each compression, wherein the signal is produced by the sound generating assembly, wherein the sound generating assembly is configured to produce an audible signal when the assembly is pressed with force sufficient for CPR and released.

13. The CPR training manikin of claim 1, wherein the structure does not include a head.

14. The CPR training manikin of claim 1, wherein the structure does not include a neck.

15. The CPR training manikin of claim 1, wherein the structure does not include a functional feature adapted to simulate resuscitation breathing techniques.

16. The CPR training manikin of claim 1, wherein the structure does not include a functional feature adapted to simulate mouth-to-mouth artificial respiration.

17. The CPR training manikin of claim 8, wherein the structure does not include neck features.

18. The CPR training manikin of claim 8, wherein the structure does not include head features.

19. The CPR training manikin of claim 8, wherein the structure does not include a neck.

* * * * *